(12) United States Patent
Yoon et al.

(10) Patent No.: US 7,256,704 B2
(45) Date of Patent: Aug. 14, 2007

(54) SYSTEM AND METHOD FOR CONTROLLING HOME APPLIANCES

(75) Inventors: Sang Chul Yoon, Kyungki-do (KR); Duck Goo Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 664 days.

(21) Appl. No.: 10/193,100

(22) Filed: Jul. 12, 2002

(65) Prior Publication Data

US 2003/0018776 A1    Jan. 23, 2003

(30) Foreign Application Priority Data

Jul. 20, 2001    (KR)    ............................... 2001-43715

(51) Int. Cl.
*G05B 23/02* (2006.01)
*G06F 15/173* (2006.01)

(52) U.S. Cl. ..................... 340/825; 340/3.1; 709/223; 709/224

(58) Field of Classification Search ........ 709/223–225, 709/245, 249; 700/110, 9, 19, 20, 174; 340/3.1, 340/825, 853
See application file for complete search history.

(56) References Cited

U.S. PATENT DOCUMENTS

| | | | |
|---|---|---|---|
| 6,052,803 A | * | 4/2000 | Bhatia et al. ................. 714/49 |
| 6,587,739 B1 | * | 7/2003 | Abrams et al. ............... 700/83 |
| 6,738,382 B1 | * | 5/2004 | West et al. ................. 370/401 |
| 6,763,040 B1 | * | 7/2004 | Hite et al. .................. 370/522 |
| 6,904,134 B2 | * | 6/2005 | Jeon et al. ............... 379/93.07 |
| 7,035,270 B2 | * | 4/2006 | Moore et al. ............... 370/401 |
| 7,088,238 B2 | * | 8/2006 | Karaoguz et al. ....... 340/539.14 |
| 2002/0026528 A1 | * | 2/2002 | Lo ............................. 709/245 |
| 2002/0035624 A1 | * | 3/2002 | Kim ........................... 709/222 |
| 2003/0018733 A1 | * | 1/2003 | Yoon et al. ................. 709/208 |
| 2003/0177268 A1 | * | 9/2003 | Youn et al. ................. 709/245 |
| 2005/0184852 A1 | * | 8/2005 | Lee ............................ 340/3.1 |

FOREIGN PATENT DOCUMENTS

JP    2002094528 A    *    3/2002

* cited by examiner

*Primary Examiner*—Anthony Knight
*Assistant Examiner*—Jennifer L. Norton
(74) *Attorney, Agent, or Firm*—Greenblum & Bernstein, P.L.C.

(57) ABSTRACT

A system and method for controlling a plurality of home appliances provided in a building, wherein home appliance built-in communication modules are each adapted to convert information in an Ethernet standard format into that of a home appliance standard format and adapters are provided to connect the home appliance built-in communication modules to a phoneline network alliance (PNA) provided in the building to transmit and receive information therebetween. The home appliances can be controlled over a network using an existing telephone line. The adapters allow interconnection of the plurality of home appliances with no distance limitations.

17 Claims, 3 Drawing Sheets

SYSTEM AND METHOD FOR CONTROLLING HOME APPLIANCES

BACKGROUND OF THE INVENTION

1. Field of the Invention

The present invention relates to a system and method for controlling home appliances, and in particular to a system and method for controlling a plurality of home appliances through a phoneline network alliance (PNA) provided in a building.

2. Description of the Related Art

A known home appliance networking system includes a plurality of home appliances interconnected via an internal network of a home or building, which is in turn connected to an external Internet network, thereby enabling a user to control the home appliances from anywhere inside or outside of the home or building.

In the known home appliance networking system, particularly, the user can access status information of a specific home appliance at any place inside of the home or building, and can control a specific home appliance using control means, such as a computer, at any place outside of the home or building. In this regard, the known home appliance networking system has obtained favorable responses from many consumers, and thus has become widespread in its application.

However, the above mentioned home appliance networking system has a disadvantage in that a local area network (LAN) must be constructed in the home or building to interconnect the home appliances via the internal network of the home or building and control the interconnected appliances in an integrated manner, resulting in a great cost being incurred.

In other words, in the known system, even though a user may wish to install home appliances in an existing building and control them via the internal network of the building, the user will be unable to control the home appliances so long as the internal network is not equipped with a system such as a LAN line. In order to control the home appliances, a separate network must be constructed in the building, thereby increasing the cost required for installing the home appliances.

Figure 1:
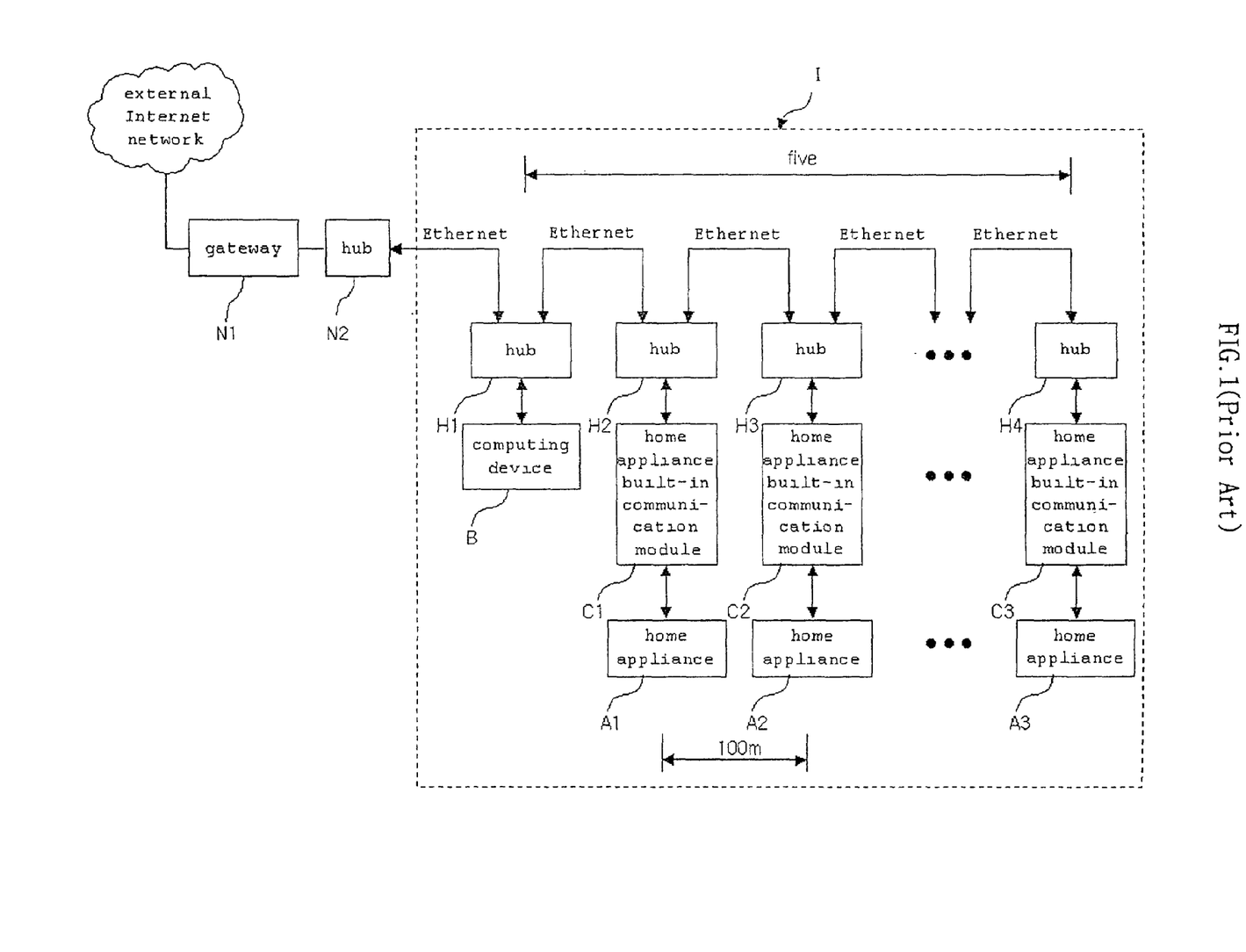
FIG. 1 is a block diagram showing the construction of a conventional home appliance control system.

Furthermore, even in a case where the internal network of the building is already equipped with a system such as a LAN line, the home appliances must be interconnected via hubs at limited distances, as shown in FIG. 1.

FIG. 1 shows a conventional home appliance control system. As shown in this drawing, an Internet network outside of a building (referred to hereinafter as an "external Internet network") is connected to an Internet network I inside of the building (referred to hereinafter as an "internal Internet network") via networking equipment such as a gateway N1 and a hub N2. The internal Internet network I includes a computing device B having such a public Internet protocol (IP) address as to be accessible by the external Internet network. The computing device B is adapted to assign respective private IP addresses to a plurality of home appliances A1, A2 and A3, and to transfer control information from the external Internet network to the home appliances A1, A2, and A3. To this end, the computing device B may include, for example, a server. A plurality of built-in home appliance communication modules C1, C2, and C3 are provided in the home appliances A1, A2, and A3, respectively, to convert the format of information, transmitted and received between corresponding home appliances A1, A2, and A3, and the external Internet network on the basis of the private IP addresses assigned by the computing device B, into standard formats of the corresponding home appliances and a standard format of the external Internet network, respectively. A plurality of hubs H1, H2, H3, and H4 are provided to interconnect the computing device B and the built-in home appliance communication modules C1, C2, and C3.

However, the interconnection of the computing device B and home appliance built-in communication modules C1, C2, and C3 using the plurality of hubs H1, H2, H3, and H4 is subject to limitations by Ethernet standards and hub structures. Because of such limitations, the number of communication modules connectable via the hubs is five at maximum and the distance between adjacent communication modules is 100 meters at maximum.

SUMMARY OF THE INVENTION

Therefore, the present invention is directed to a home appliance control system which addresses the problems existing in the prior art, discussed above. It is an object of the present invention to provide a system and method which are capable of controlling a plurality of home appliances provided in a building through a PNA provided in the building and overcoming a distance limitation when the home appliances are interconnected, thereby enabling the home appliances to be controlled efficiently at a low cost.

According to an aspect of the present invention, the above and other objects can be accomplished by the provision of a home appliance control system including at least one home appliance provided in a building and controlled in response to control information sent over the Internet, the home appliance generating information about its controlled status and transmitting the generated status information over the Internet; a phoneline network alliance provided in the building; an external Internet network provided outside of the building; a phoneline network alliance connection for connecting the home appliance to the phoneline network alliance such that the home appliance transmits and receives, respectively, the status information and control information via the phoneline network alliance; and networking elements for connecting the phoneline network alliance connection to the external Internet network and controlling the connection such that the phoneline network alliance is connected to the external Internet network.

According to another aspect of the present invention, there is provided a method for controlling at least one home appliance provided in a building, including converting the format of information sent from an external Internet network provided outside of the building into the standard format of a phoneline network alliance provided in the building; transmitting the format converted information through the phoneline network alliance; converting the phoneline network alliance standard format of the information into an Ethernet standard format; and controlling the home appliance according to the information converted from the phoneline network alliance standard format into an Ethernet standard format.

According to an aspect of the present invention, a home appliance control system is provided including at least one home appliance provided in a building and controlled in response to control information transmitted over the Internet, the home appliance generating information about its controlled status and transmitting the generated status information over the Internet; a phoneline network alliance provided in the building; an external Internet network provided outside of the building; phoneline network alliance connection equipment that connects the home appliance to the phoneline network alliance such that the home appliance transmits and receives, respectively, the status information and control information via the phoneline network alliance; and networking equipment that connects the phoneline network alliance connection equipment to the external Internet network and controls the connection such that the phoneline network alliance is connected to the external Internet network. The phoneline network alliance connection equipment may also include a computing device that assigns a private Internet protocol (IP) address to the home appliance; a first adapter configured to convert the format of information transmitted from the computing device to the phoneline network alliance into a standard format of the phoneline network alliance and to convert the format of information received by the computing device from the phone line network alliance to an Ethernet standard; a second adapter configured to convert the format of information transmitted from the home appliance to the phoneline network alliance into a standard format of said phoneline network alliance and to convert information received by the home appliance from the phoneline network alliance into an Ethernet standard; and a home appliance built-in communication module configure to store the private IP address assigned by the computing device, to connect the second adapter to the home appliance, and to convert data of the Ethernet standard format from the second adapter into that of a standard format of the home appliance.

In another aspect of the present invention, the second adapter is connected to the home appliance built-in communication module and connects the home appliance to the phoneline network alliance so as to enable transmission and reception of data in the Ethernet standard format between the home appliance and the phoneline network alliance. In another aspect of the present invention, the first adapter connects the computing device to the networking equipment and the phoneline network alliance and converts the format of data transmitted between the computing device and the networking equipment into the Ethernet standard format, converts the format of data transmitted from the computing device to the phoneline network alliance into the phoneline network alliance standard format, and converts the format of data transmitted from the phoneline network alliance to the computing device into the Ethernet standard format, respectively. Further, the computing device may have a public IP address such that it is accessible by the external Internet network.

In a further aspect of the present invention, the home appliance built-in communication module is configured to receive the control information through the second adapter, to convert the format of the received control information into the home appliance standard format only when it contains information regarding the same private IP address as that stored therein, and to transfer the resulting control information to the home appliance. The networking equipment may include a gateway configured to act as an ingress for connecting the external Internet network to the phoneline network alliance; and a hub configured to transfer data from the gateway to the phoneline network alliance connection equipment.

According to a further aspect of the present invention, a method is provided including providing at least one home appliance and a phoneline network alliance in a building; converting the format of information sent from an external Internet network provided outside of the building into a standard format of the phoneline network alliance; transmitting the information converted from the format of information sent from the external Internet network into the standard format the phoneline network alliance; converting the phoneline network alliance standard format of the information transmitted through the phoneline network alliance into an Ethernet standard format; and controlling the home appliance according to the information converted from the phoneline network alliance standard format into the Ethernet standard format. The method may further include converting the phoneline network alliance standard format into an Ethernet standard format, after converting the Ethernet standard format of the information converted into a standard format of the home appliance such that the converted information is processable by the home appliance. In a further aspect of the present invention, the method may further include assigning a private Internet protocol (IP) address to the home appliance; and storing the assigned private IP address in the home appliance; whereby the information converted from the phoneline network alliance standard into an Ethernet standard format contains information regarding the same private IP address as that stored in the home appliance.

BRIEF DESCRIPTION OF THE DRAWINGS

The above and other objects, features and other advantages of the present invention will be made apparent from the following detailed description of the preferred embodiments, given as non-limiting examples, with reference to the accompanying drawings, in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 2:
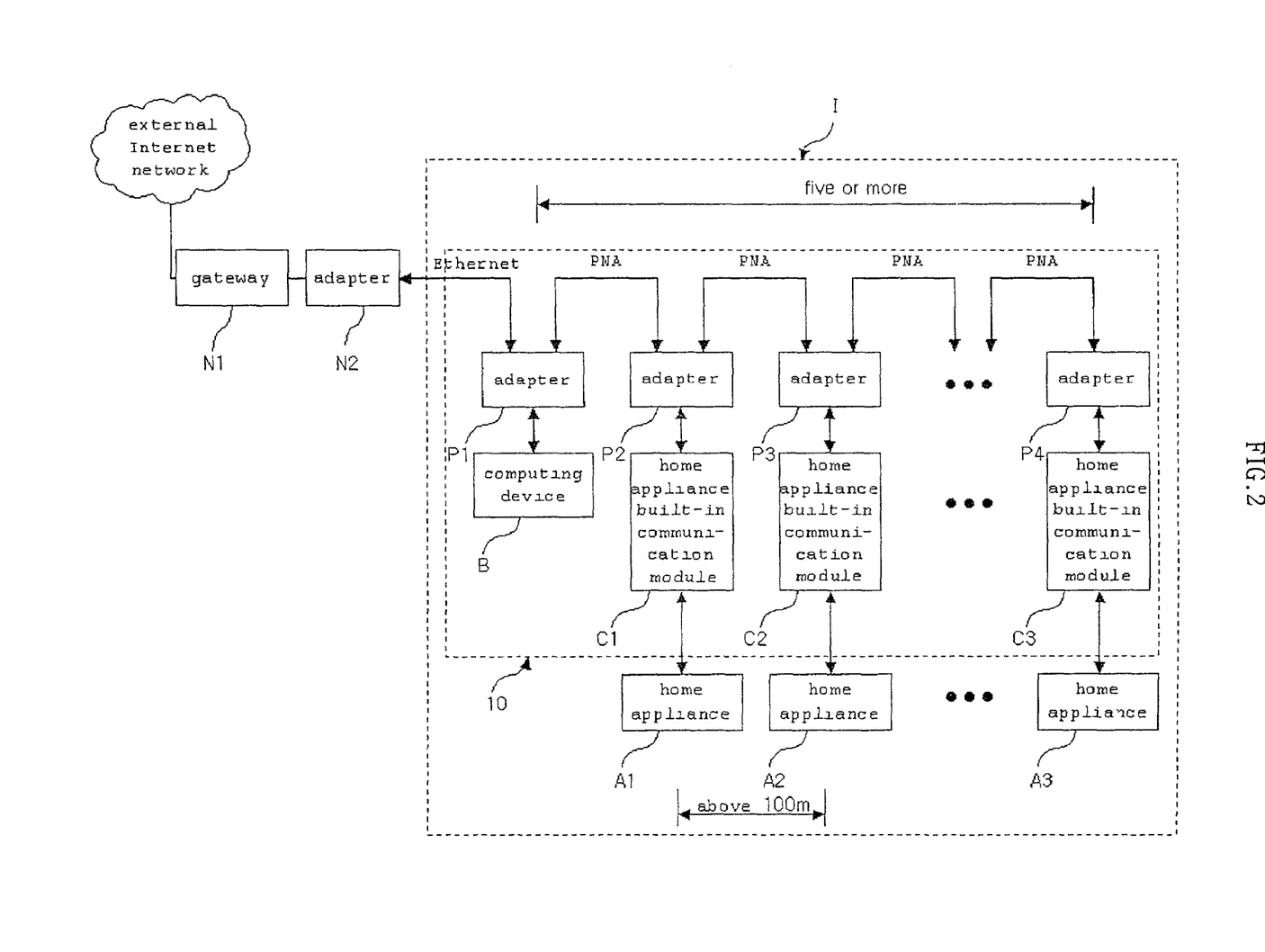
FIG. 2 is a block diagram showing the construction of a home appliance control system according to an aspect of the present invention.

With reference to FIG. 2, there is shown in block form a home appliance control system according to the present invention. As shown in FIG. 2, the home appliance control system includes networking equipment for interconnecting an Internet network provided outside of a building (referred to hereinafter as an "external Internet network") and a network I provided inside the building (referred to hereinafter as an "internal network"). The networking equipment may be provided with a gateway N1 and hub N2. Phoneline network alliance (PNA) connection equipment 10 may be provided in the internal network I to transmit and receive data between the networking equipment and a PNA provided in the building, and to connect the PNA to a plurality of home appliances A1, A2, and A3 provided in the building.

The PNA connection equipment 10 includes a computing device B having a public Internet protocol (IP) address that is accessible by the external Internet network via the networking equipment. The computing device B is able to assign respective private IP addresses to the plurality of home appliances A1, A2, and A3. To this end, the computing device B may include a server. A plurality of built-in home appliance communication modules C1, C2, and C3 are provided in the home appliances A1, A2, and A3, respectively, to store the private IP addresses of the corresponding home appliances A1, A2, and A3, assigned by the computing device B, and to convert the format of information, transmitted from the external Internet network to the corresponding home appliances on the basis of the stored private IP addresses, into the standard format of the corresponding appliances such that the transmitted information can be received by the corresponding appliances. The PNA connection equipment 10 further includes a plurality of adapters P1, P2, P3, and P4 for connecting the computing device B and built-in home appliance communication modules C1, C2, and C3 to the PNA provided in the building, respectively. The adapters P1, P2, P3, and P4 are also able to convert the format of information transmitted and received between the computing device B and communication modules C1, C2 and C3, and the PNA into an Ethernet standard format and a standard format of the PNA, respectively.

The adapters P1, P2, P3, and P4 are preferably protocol conversion adapters. The adapters convert information in the PNA standard format from the PNA into information in the Ethernet standard format and transfer the format converted information to the computing device B and built-in home appliance communication modules C1, C2, and C3, respectively. Further, the adapters convert information in the Ethernet standard format from the computing device B and communication modules C1, C2, and C3 into information of the PNA standard format and transfer the format converted information to the PNA, respectively.

Therefore, as compared with the conventional use of hubs which allow a maximum of five home appliances to be interconnected at a distance between each home appliance of 100 meters, the use of adapters according to the present invention enables five or more home appliances, which adjacent home appliances may be spaced apart from each other at a distance of 100 meters or greater, to be connected to the PNA and all may be efficiently controlled.

The adapter P1, which connects the computing device B to the PNA, also functions to transmit and receive information in the Ethernet standard format between the computing device B and the networking equipment. The adapter P1 further functions to convert the format of information, transmitted and received between the computing device B and the home appliances A1, A2, and A3 via the PNA, into the PNA standard format and the Ethernet standard format, respectively. As a result, the computing device B can transmit and receive information in the Ethernet standard format via the PNA, also.

Figure 3:
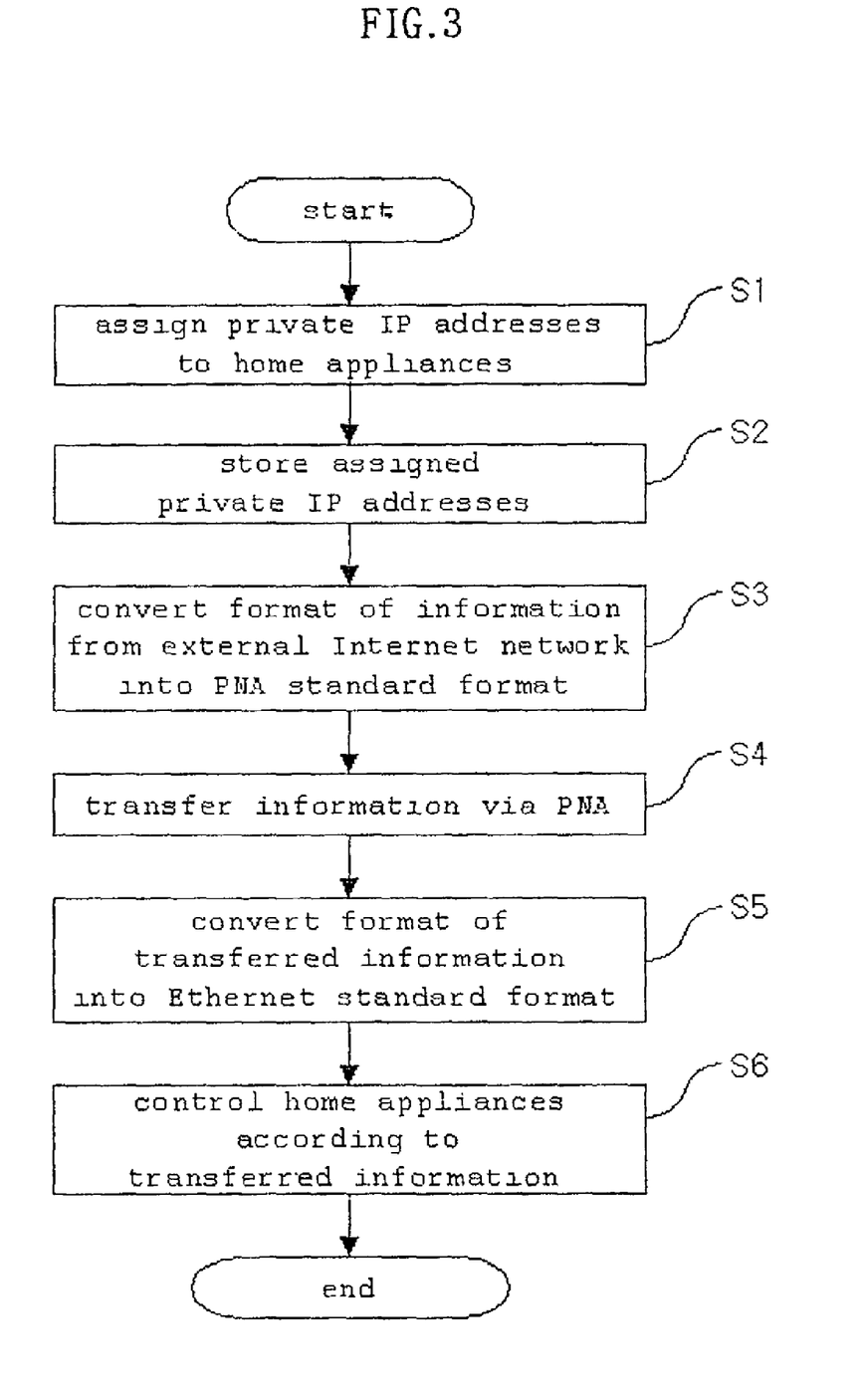
FIG. 3 is a flow chart illustrating a method for controlling home appliances according to an aspect of the present invention.

The operation of the home appliance control system with the above stated construction in accordance with the present invention will hereinafter be described in detail with reference to FIG. 3.

Initially, in the first step S1, the computing device B assigns private IP addresses to the plurality of home appliances A1, A2, and A3 in the building.

In the second step S2, the built-in home appliance communication modules C1, C2, and C3 provided in the home appliances A1, A2, and A3 store the private IP addresses assigned by the computing device B, respectively.

In the third step S3, the adapter P1 receives information from the external Internet network via the computing device B to control the home appliances A1, A2, and A3, or information which is applied directly to the home appliances A1, A2, and A3 via the computing device B and converts the format of the received information into the PNA standard format.

A user, when outside of the building, can gain access to the computing device B using the public IP address thereof to control the plurality of home appliances A1, A2, and A3 through the external Internet network. After accessing the computing device B using the public IP address thereof, the user outside of the building can enter control information about a specific home appliance to be controlled to the computing device B, and the computing device B can thus control the specific home appliance according to the entered control information.

In the fourth step S4, the format converted information of the third step S3 is transferred to the home appliances A1, A2, and A3 via the PNA in the internal network I of the building.

In the fifth step S5, the adapters P2, P3, and P4, which are connected to the built-in home appliance communication modules C1, C2, and C3, respectively, convert the PNA standard format of the PNA information to be transferred to the home appliances A1, A2, and A3, into the Ethernet standard format. The information to be transferred to the home appliances A1, A2, and A3 contains information regarding the private IP address of the specific home appliance to be controlled. In this connection, upon receiving the information converted by the adapters P2, P3, and P4, each of the built-in home appliance communication modules C1, C2, and C3 converts the Ethernet standard format of the received information into the standard format of a corresponding one of the home appliances A1, A2, and A3 and transfers the resulting information to the corresponding home appliance only when the private IP address contained in the received information is the same as that of the corresponding appliance.

In the sixth step S6, the information converted in the fifth step S5 is transferred to the respective home appliances A1, A2, and A3 through the respective communication modules C1, C2, and C3, so as to control the home appliances A1, A2, and A3.

As is apparent from the above description, the present invention provides a system and method for controlling a plurality of home appliances provided in a building, wherein built-in home appliance communication modules are each adapted to convert information in an Ethernet standard format into a home appliance standard format and adapters are provided to connect the built-in home appliance communication modules to a phoneline network alliance (PNA) already provided in the building to transmit and receive information therebetween. Therefore, the home appliances provided in the building can be controlled over a network using an existing telephone line, with no necessity for installing a separate local area network (LAN) line, resulting in a reduction in installation cost. Further, the use of the adapters enables the plurality of home appliances to be interconnected with no distance limitation. Therefore, the plurality of home appliances in the building can be efficiently controlled.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, XML, HTTP) represent examples of the state of the art. Such standards are periodically superseded by faster or more efficient equivalents having essentially the same functions. Accordingly, replacement standards and protocols having the same functions are considered equivalents.

The present disclosure relates to subject matter contained in priority Korean Application No. 2001-0043715, filed on Jul. 20, 2001, which is herein expressly incorporated by reference in its entirety.

What is claimed is:

1. A home appliance control system comprising:
   a plurality of home appliances provided in a building and controlled in response to control information transmitted over an Internet, said home appliances generating information about their controlled status and transmitting the generated status information over the Internet;
   a phoneline network alliance provided in the building;
   an external Internet network provided outside of the building;
   a phoneline network alliance connector that connects said home appliances to said phoneline network alliance such that said home appliances transmit and receive said status information and control information via said phoneline network alliance,
   wherein said phoneline network alliance connector comprises:
   a computer that assigns a private Internet protocol (IP) address to said home appliances;
   a first adapter that converts formats of information transmitted from said phoneline network alliance to said computer into an Ethernet standard format, and that converts formats of information received from said computer to said phoneline network alliance into a standard format of the phoneline network alliance;
   a second adapter that converts formats of information transmitted from said home appliances to said phoneline network alliance into a standard format of said phoneline network alliance, and that converts formats of information received from said phoneline network alliance to said home appliances into an Ethernet standard format; and
   a home appliance built-in communication module that stores said private IP address assigned by said computer, said home appliance built in communication module connecting said second adapter to said home appliances and converting data of said Ethernet standard format from said second adapter into that of a standard format of said home appliances; and
   a network that connects said phoneline network alliance connector to said external Internet network and controlling the connection such that said phoneline network alliance is connected to said external Internet network;
   wherein each of said home appliances connected to said home appliance control system receives data in an Ethernet standard format; and
   wherein said second adapter is connected to said built-in communication module to connect said home appliances to said phoneline network alliance so as to enable transmission and reception of data of said Ethernet standard format between said home appliances and said phoneline network alliance.

2. The home appliance control system as set forth in claim 1, wherein said first adapter is configured to connect said computer to said network and said phoneline network alliance, respectively, and to convert formats of data transmitted and received between said computer and said network into said Ethernet standard format, a format of data transmitted from said computer to said phoneline network alliance into said phoneline network alliance standard format, and a format of data transmitted from said phoneline network alliance to said computer into said Ethernet standard format, respectively.

3. The home appliance control system as set forth in claim 1, wherein said computer has a public IP address such that it is accessible by said external Internet network.

4. The home appliance control system as set forth in claim 1, wherein said home appliance built-in communication module is configured to receive said control information through said second adapter, to convert a format of the received control information into said home appliance standard format only when it contains information regarding the same private IP address as that stored therein, and to transfer the resulting control information to said home appliances.

5. The home appliance control system as set forth in claim 1, wherein said network includes:
   a gateway acting as an ingress that connects said external Internet network to said phoneline network alliance; and
   a hub that transfers data from said gateway to said phoneline network alliance connector.

6. A method for controlling a plurality of home appliances provided in a building, comprising:
  converting a format of information sent from an external Internet network provided outside of the building into a standard format of a phoneline network alliance provided in the building;
  connecting said home appliances to said phoneline network alliance, via a phoneline network alliance connector, such that said home appliances transmit and receive said status information and control information via said phoneline network alliance, said phoneline network alliance connector comprising:
    a computer that assigns a private Internet protocol (IP) address to said home appliances;
    a first adapter that converts formats of information transmitted from the phoneline network alliance to the computer into an Ethernet standard format, and that converts formats of information received from the computer to the phoneline network alliance into a standard format of the phoneline network alliance;
    a second adapter that converts formats of information transmitted from said home appliances to said phoneline network alliance into a standard format of said phoneline network alliance, and that converts formats of information received from said phoneline network alliance to said home appliances into an Ethernet standard format; and
    a home appliance built-in communication module that stores the private IP address assigned by the computer, said home appliance built-in communication module connecting the second adapter to said home appliances and converting data of the Ethernet standard format from said second adapter into that of a standard format of said home appliances;
  transmitting said information converted into the standard format of said phoneline network alliance over said phoneline network alliance; converting the information transmitted over said phoneline network alliance into an Ethernet standard format;
  controlling said home appliances according to said information converted into the Ethernet standard format;
  configuring each of the home appliances, connected to said home appliance control system, to receive data in an Ethernet standard format; and
  connecting said second adapter to said built-in communication module such that said home appliances are connected to said phoneline network alliance so to enable transmission and reception of data of said Ethernet standard format, between said home appliances and said phoneline network alliance.

7. The method as set forth in claim 6, further comprising:
  converting the phoneline network alliance standard format into an Ethernet standard format, after converting the Ethernet standard format of said information converted into a standard format of said home appliances such that said converted information is processable by said home appliances.

8. The method as set forth in claim 6, further comprising:
  assigning a private Internet protocol (IP) address to said home appliances; and
  storing the assigned private IP address in said home appliances;
  whereby said information converted from the phoneline network alliance standard into an Ethernet standard format contains information regarding the same private IP address as that stored in said home appliances.

9. A home appliance control system comprising:
  a plurality of home appliances provided in a building and controlled in response to control information transmitted over an Internet, said home appliances generating information about their controlled status and transmitting the generated status information over the Internet;
  a phoneline network alliance provided in the building;
  an external Internet network provided outside of the building;
  phoneline network alliance connection equipment that connects said home appliances to said phoneline network alliance such that said home appliances transmit and receive, respectively, said status information and control information via said phoneline network alliance, wherein said phoneline network alliance connection equipment comprises:
    a computer that assigns a private Internet protocol (IP) address to said home appliances;
    a first adapter that converts formats of information transmitted from said phoneline network alliance to said computer into an Ethernet standard format, and that converts formats of information received from said computer to said phoneline network alliance into a standard format of the phoneline network alliance;
    a second adapter that converts formats of information transmitted from said home appliances to said phoneline network alliance into a standard format of said phoneline network alliance, and that converts formats of information received from said phoneline network alliance to said home appliances into an Ethernet standard format; and
    a home appliance built-in communication module that stores said private IP address assigned by said computer, said home appliance built in communication module connecting said second adapter to said home appliances and converting data of said Ethernet standard format from said second adapter into that of a standard format of said home appliances; and
  networking equipment that connects said phoneline network alliance connection equipment to said external Internet network and controls the connection such that said phoneline network alliance is connected to said external Internet network;
  wherein each home appliance connected to said home appliance control system receives data in an Ethernet standard format; and
  wherein said second adapter is connected to said built-in communication module to connect said home appliances to said phoneline network alliance so as to enable transmission and reception of data of said Ethernet standard format between said home appliances and said phoneline network alliance.

10. The home appliance control system as set forth in claim 9, wherein said first adapter connects said computer to said networking equipment and said phoneline network alliance and converts the format of data transmitted between said computer and said networking equipment into said Ethernet standard format, converts the format of data transmitted from said computer to said phoneline network alliance into said phoneline network alliance standard format, and converts the format of data transmitted from said phoneline network alliance to said computer into said Ethernet standard format, respectively.

11. The home appliance control system as set forth in claim 9, wherein said computer has a public IP address such that it is accessible by said external Internet network.

12. The home appliance control system as set forth in claim 9, wherein said home appliance built-in communication module is configured to receive said control information through said second adapter, to convert a format of said control information into said home appliance standard format only when it contains information regarding the same private IP address as that stored therein, and to transfer the resulting control information to said home appliances.

13. The home appliance control system as set forth in claim 9, wherein said networking equipment includes:
a gateway configured to act as an ingress to connect said external Internet network to said phoneline network alliance; and
a hub configured to transfer data from said gateway to said phoneline network alliance connection equipment.

14. A method comprising:
providing a plurality of home appliances and a phoneline network alliance in a building;
converting a format of information sent from an external Internet network provided outside of the building into a standard format of the phoneline network alliance;
connecting said home appliances to said phoneline network alliance, via a phoneline network alliance connector, such that said home appliances transmit and receive said status information and control information via said phoneline network alliance, said phoneline network alliance connector comprising:
a computer that assigns a private Internet protocol (IP) address to said home appliances;
a first adapter that converts formats of information transmitted from the phoneline network alliance to the computer into an Ethernet standard format, and that converts formats of information received from the computer to the phoneline network alliance into a standard format of the phoneline network alliance;
a second adapter that converts formats of information transmitted from said home appliances to said phoneline network alliance into a standard format of said phoneline network alliance, and that converts formats of information received from said phoneline network alliance to said home appliances into an Ethernet standard format; and
a home appliance built-in communication module that stores the private IP address assigned by the computer, said home appliance built-in communication module connecting the second adapter to said home appliances and converting data of the Ethernet standard format from said second adapter into that of a standard format of said home appliance;
transmitting said information converted into the standard format of said phoneline network alliance over said phoneline network alliance;
converting the information transmitted over said phoneline network alliance into an Ethernet standard format;
controlling said home appliances according to said information converted into the Ethernet standard format;
configuring each of said home appliances, connected to said home appliance control system, to receive data in an Ethernet standard format; and
connecting said second adapter to said built-in communication module such that said home appliances are connected to said phoneline network alliance so to enable transmission and reception of data of said Ethernet standard format, between said home appliances and said phoneline network alliance.

15. The method as set forth in claim 14, further comprising:
converting the phoneline network alliance standard format into an Ethernet standard format, after converting the Ethernet standard format of said information converted into a standard format of said home appliances such that said converted information is processable by said home appliances.

16. The method as set forth in claim 14, further comprising:
assigning a private Internet protocol (IP) address to said home appliances; and
storing the assigned private IP address in said home appliance;
whereby said information converted from the phoneline network alliance standard into an Ethernet standard format contains information regarding the same private IP address as that stored in said home appliances.

17. A home appliance control system comprising:
a plurality of home appliances provided in a building and controlled in response to control information transmitted over an Internet, said home appliances generating information about their controlled status and transmitting the generated status information over the Internet;
communicators provided in each one of the plurality of home appliances;
a plurality of adapters which interconnect the computer to the plurality of home appliances;
a phoneline network alliance provided in the building;
an external Internet network provided outside of the building;
a phoneline network alliance connector that connects said home appliance to said phoneline network alliance such that said home appliances transmit and receive said status information and control information via said phoneline network alliance,
wherein said phoneline network alliance connector comprises:
a computer that assigns a private Internet protocol (IP) address to said home appliances;
a first adapter that converts formats of information transmitted from said phoneline network alliance to said computer into an Ethernet standard format, and that converts formats of information received from said computer to said phoneline network alliance into a standard format of the phoneline network alliance;
a second adapter that converts formats of information transmitted from said home appliances to said phoneline network alliance into a standard format of said phoneline network alliance, and that converts formats of information received from said phoneline network alliance to said home appliances into an Ethernet standard format; and
a home appliance built-in communication module that stores said private IP address assigned by said computer, said home appliance built in communication module connecting said second adapter to said home appliances and converting data of said Ethernet standard format from said second adapter into that of a standard format of said home appliances; and
a network that connects said phoneline network alliance connector to said external Internet network and controlling the connection such that said phoneline network alliance is connected to said external Internet network;
wherein each of said home appliances connected to said home appliance control system receives data in an Ethernet standard format; and wherein said second adapter is connected to said built-in communication module to connect said home appliances to said phoneline network alliance so as to enable transmission and reception of data of said Ethernet standard format between said home appliances and said phoneline network alliance.

* * * * *

UNITED STATES PATENT AND TRADEMARK OFFICE
CERTIFICATE OF CORRECTION

| | |
|---|---|
| PATENT NO. | : 7,256,704 B2 |
| APPLICATION NO. | : 10/193100 |
| DATED | : August 14, 2007 |
| INVENTOR(S) | : Sang Chul Yoon |

Page 1 of 1

It is certified that error appears in the above-identified patent and that said Letters Patent is hereby corrected as shown below:

Title Pg, Item (56) under U.S. PATENT DOCUMENTS, in the reference: 2005/0184852    8/2005    Lee    change "340/3.1" to --340/003.1--

At column 12, line 12 (claim 16), of the printed patent, change "appliance" to --appliances--

Signed and Sealed this

Tenth Day of June, 2008

JON W. DUDAS
*Director of the United States Patent and Trademark Office*